US008336375B2

(12) United States Patent
Thai et al.

(10) Patent No.: US 8,336,375 B2
(45) Date of Patent: Dec. 25, 2012

(54) FLOW CELL ASSEMBLY FOR FLUID SENSORS

(75) Inventors: Anthony Thai, Orange, CA (US); Steven Wells, Huntington Beach, CA (US); Gert Burkhardt, Pasadena, CA (US)

(73) Assignee: Georg Fischer Signet, LLC

( * ) Notice: Subject to any disclaimer, the term of this patent is extended or adjusted under 35 U.S.C. 154(b) by 136 days.

(21) Appl. No.: 12/819,076

(22) Filed: Jun. 18, 2010

(65) Prior Publication Data
US 2011/0308645 A1  Dec. 22, 2011

(51) Int. Cl.
G01F 15/02 (2006.01)
(52) U.S. Cl. .......................................... 73/199
(58) Field of Classification Search ............... 73/863.12, 73/198, 197, 199; 436/52; 137/599.13, 552
See application file for complete search history.

(56) References Cited

U.S. PATENT DOCUMENTS

| | | | |
|---|---|---|---|
| 2,983,184 A | 5/1961 | Ferrari | |
| 3,214,964 A | 11/1965 | Davis | |
| 4,803,869 A | 2/1989 | Barcelona et al. | |
| 5,325,709 A | 7/1994 | Lee | |
| 5,890,515 A * | 4/1999 | Spiess et al. | 137/552 |
| 6,117,684 A * | 9/2000 | Stieg et al. | 436/52 |
| 6,324,932 B1 * | 12/2001 | Slon et al. | 74/473.31 |
| 7,328,721 B2 * | 2/2008 | Kytola | 137/599.13 |
| 7,748,268 B2 * | 7/2010 | Lull et al. | 73/204.22 |

OTHER PUBLICATIONS

Rosemount Analytical, "Rosemount FCL Data Sheet", *PDS 71-FCL/rev.G*, (Jan. 1, 2006).
Endress+Hauser, "Flow assembly for chlorine sensors", *Flowfit W CCA250*, (Feb. 1, 2007).
Prominent, "Description of Component Function", 3073-2.5, (Jan. 2007).

\* cited by examiner

*Primary Examiner* — Jewel V Thompson
(74) *Attorney, Agent, or Firm* — Tsircou Law, P.C.

(57) ABSTRACT

A flow cell assembly for fluid sensors is provided. The assembly includes a housing configured to couple to an external source of fluid for measurement. The assembly further includes a flow regulator and a flow meter disposed within the housing to facilitate controlled fluid. The housing defines one or more measuring chambers each configured to receive a fluid sensor. Each measuring chamber includes an inlet aperture and a gravity overflow spaced apart from the inlet aperture. Each measuring chamber is configured to receive a fluid sensor such that a sensing end of the fluid sensor is disposed proximate to an inlet aperture of the measuring chamber, thereby ensuring controlled fluid pressure proximate to the sensing end.

23 Claims, 5 Drawing Sheets

FLOW CELL ASSEMBLY FOR FLUID SENSORS

FIELD OF THE INVENTION

The present invention relates generally to analytical systems for measuring fluids, more particularly, to fluid cell assemblies having measuring chambers for exposing sensors to a target fluid in a controlled manner.

BACKGROUND OF THE INVENTION

In various fluid flow systems, it is important to measure parameters, such as, pH, chlorine, dissolved oxygen and ozone. In fluid flow systems, such as, wastewater treatment plants and chemical treatment plants, it is preferable to take measurements, without interrupting the system. Prior approaches for measuring such parameters include inserting sensors into the fluid flowing system but logistical issues arose as to the mounting of these sensors. In addition, measurement issues related to the variable pressures and flow rates of the system arose. Lastly, multiple components would be mounted at separate locations, but this could be very costly and time consuming.

Historically, pH measurements of a fluid have been monitored by obtaining a sample of the fluid and submerging a pH indication tape or an electrochemical sensor into the sample. Analyses of parameters such as pH chlorine, dissolved oxygen and ozone are sensitive and need to be handled properly. Removing the fluid from the sampling line and exposing it to air changes the composition of the fluid. In the case of using a pH probe, the probe generates an electrical signal that is converted into meaningful pH values by an appropriate electronic processor and those values are displayed on a meter. The probe sensor calibration process includes checking and calibrating the electronic processor to display the desired value for each buffer solution.

Furthermore, electrochemical sensors have long been used to measure parameters of fluids. Such sensors typically include a measuring electrode assembly and a reference electrode assembly, both which are electrically coupled to an instrument that senses the difference in electrical potential between the electrodes. In sensors of this kind, the measuring electrode assembly typically is exposed directly to the target fluid, either batch testing a grab sample or continuously using a flow cell that directs the fluid flow to the sensor.

In many conventional flow cells, a fluid stream continually flows past the sensor to a waste outlet. However, pressure and flow velocity fluctuations can cause errors. Conventional flow cells do little to facilitate consistent, accurate sensor output by eliminating the potential for pressure or flow changes in the fluid stream. Additionally, the fluid parameters may change when sampled and exposed to the air.

It should be appreciated that there remains a need for an integrated flow cell that addresses these concerns. The present invention fulfills this need and others.

SUMMARY OF THE INVENTION

In general terms, the present invention provides a flow cell assembly for that allows for measurement of the fluid properties in-situ using various sensors. The assembly includes a housing configured to couple to an external source of fluid for measurement. The assembly further includes a flow regulator and a flow meter disposed within the housing to facilitate fluid control. The housing defines a measuring chamber configured to receive one or more a fluid sensors. The measuring chamber includes an inlet aperture and a gravity overflow spaced apart from the inlet aperture. The measuring chamber is configured to receive a fluid sensor such that a sensing end of the fluid sensor is disposed proximate to an inlet aperture of the measuring chamber, thereby ensuring controlled fluid flow proximate to the sensing end.

More particularly, in an exemplary embodiment, the housing includes a front block and a rear block configured to mate together in a facing relationship. The mating sides of the front and the rear blocks define a fluid flow path within the housing. The fluid flow path includes a measuring chamber having an inlet aperture and a gravity overflow spaced apart from the inlet aperture. The measuring chamber is configured to receive a fluid sensor such that a sensing end of the fluid sensor is disposed proximate to an inlet aperture of the measuring chamber.

In a detailed aspect of an exemplary embodiment, the mating sides of the front and the rear blocks define a fluid flow path within the housing, including a plurality of measuring chambers sequentially disposed along the fluid flow path. Each measuring chamber has an inlet aperture and a gravity overflow spaced apart from the inlet aperture. Moreover, each measuring chamber is configured to receive a fluid sensor such that a sensing end of the fluid sensor is disposed proximate to an inlet aperture of the measuring chamber.

In another detailed aspect of an exemplary embodiment, the fluid flow path provides fluid communication between the housing inlet and the housing outlet. The variable area flow meter can be disposed between the flow regulator and the first measuring chamber of the plurality of measuring chambers along the fluid flow path. Moreover, a spigot can be provided in fluid communication with the fluid flow path for dispensing a fluid sample.

In yet another an exemplary embodiment, the system include a housing having an inlet that leads to a direct flow regulator, a variable area flow meter, a first measuring chamber with an opening at the top to receive a sensor, a first gravity overflow area, a second measuring chamber with an opening at the top to receive a sensor, and a second gravity overflow area that leads to an outlet spigot. A sensor is disposed in communication with the measuring chambers. The vertical dispositions of the sensors allow fluid to flow directly up through the connection channels and place consistent flow along the heads of the sensors.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which.

DETAILED DESCRIPTION OF THE PREFERRED EMBODIMENTS

Figure 1:
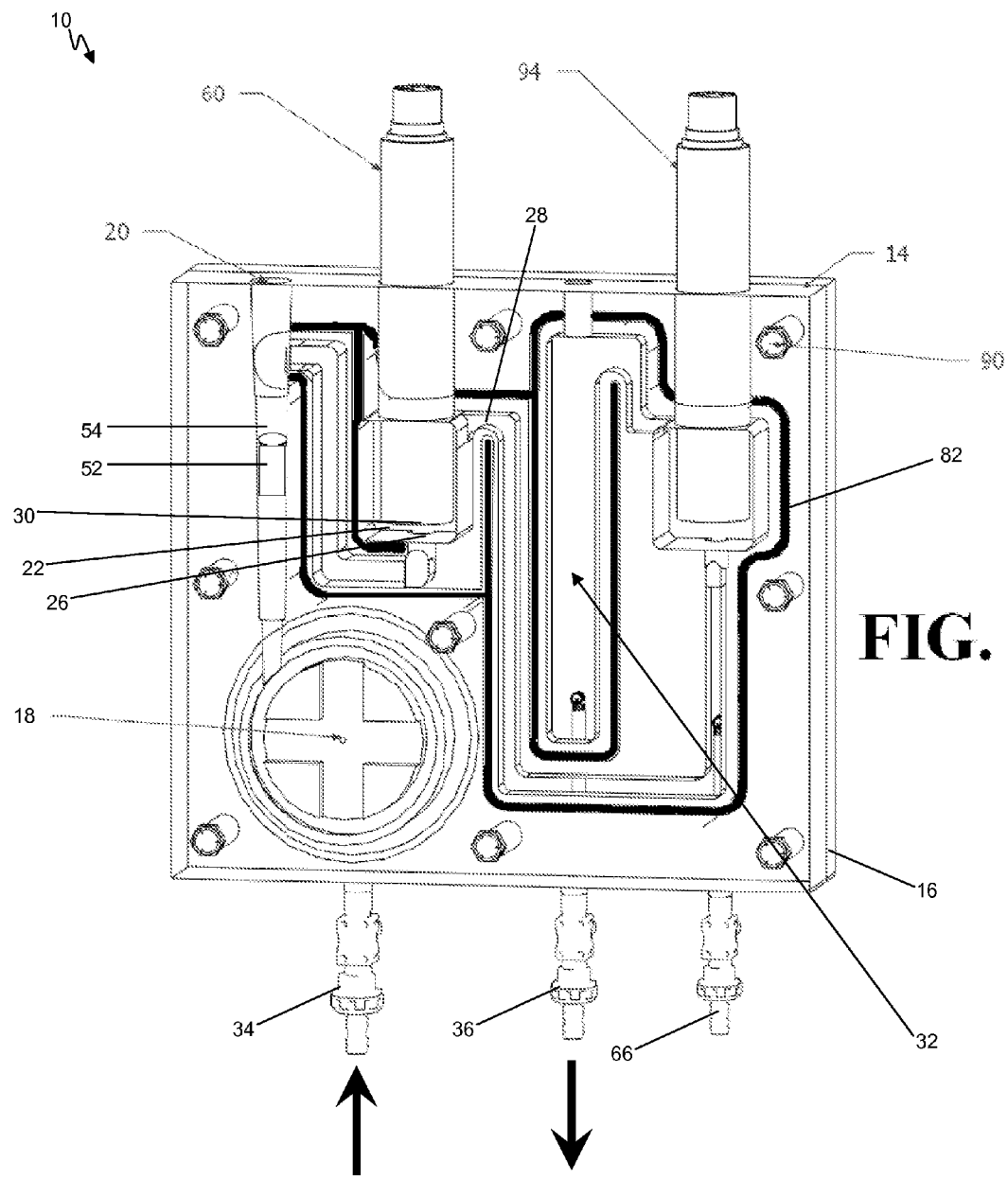
FIG. 1 is a perspective view of a flow cell assembly in accordance with the present invention.

Referring now to the drawings, and particularly to FIG. 1, there is shown flow cell assembly 10 having a housing unit 12. The assembly coupled to an external source of fluid for measurement. The housing includes a front block 14 and a rear block 16 sandwiched together. The assembly further includes a flow regulator 18 and a flow meter 20 disposed within the housing to facilitate controlled fluid flow and measurement. The housing defines at least one measuring chamber (e.g., first measuring chamber 22) configured to receive a fluid sensor. The measuring chamber includes an inlet aperture 26 and a gravity overflow 28 spaced apart from the inlet aperture. The sensing end 30 of the fluid sensor is disposed proximate to the inlet aperture, thereby ensuring controlled fluid pressure proximate to the sensing end.

Figure 2:
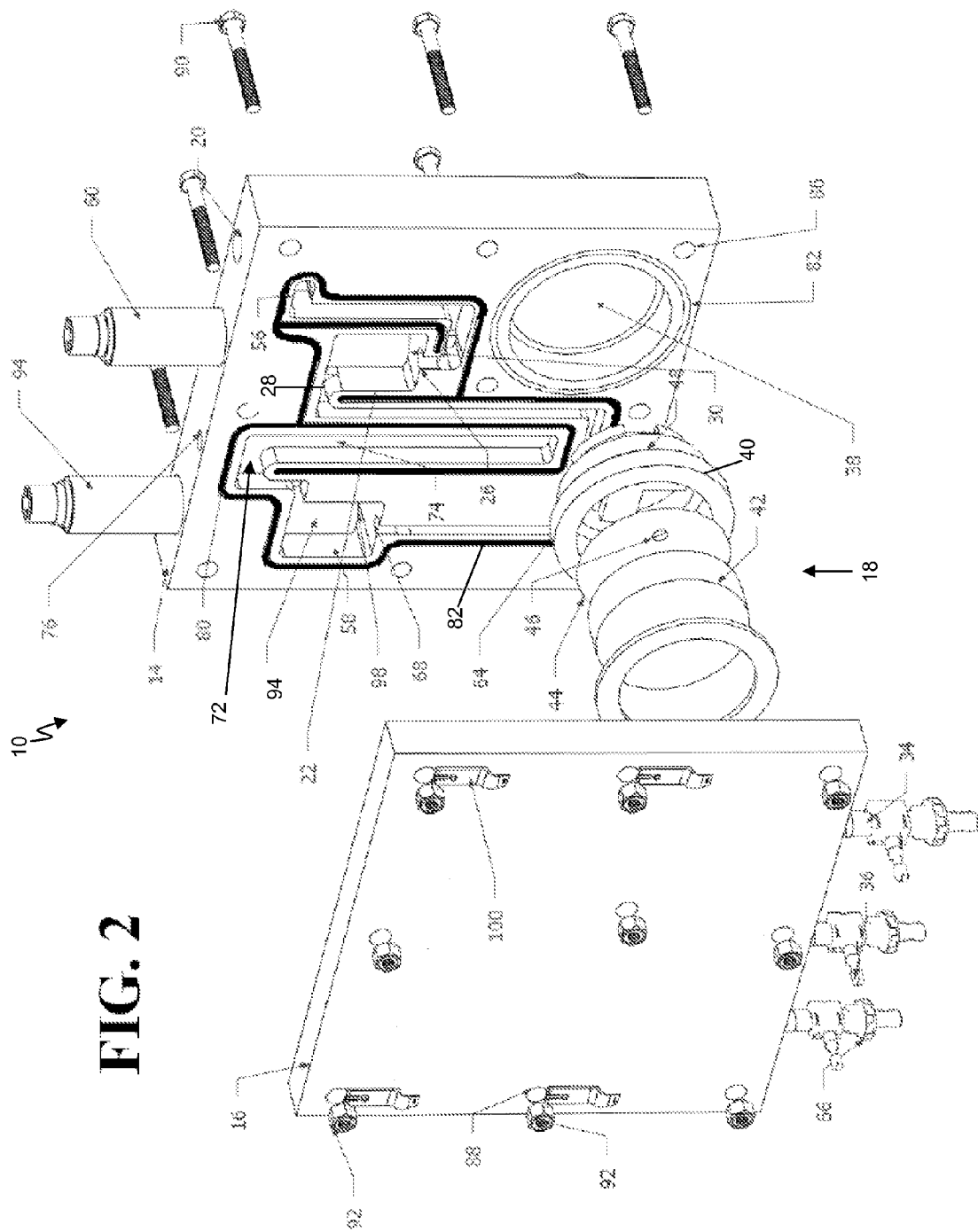
FIG. 2 is a partially exploded, rear perspective view of the flow cell assembly of FIG. 1
Figure 3:
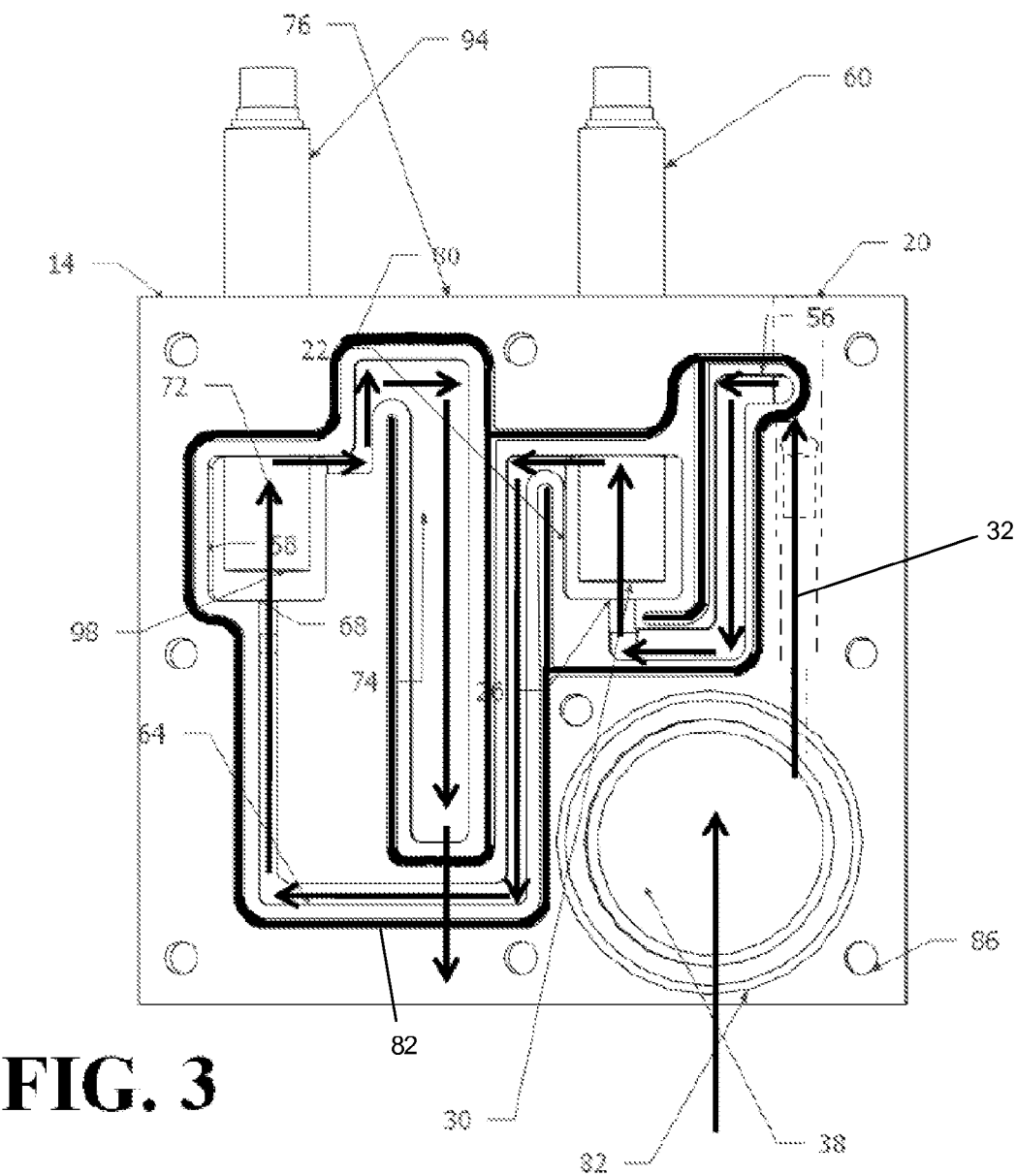
FIG. 3 is an elevational view of the mating surface of the front block of the flow cell assembly of FIG. 1.

With reference to FIG. 2, the front block 14 and the rear block 16 of the housing 12 are configured to mate together in a facing relationship. The mating sides of the front and the rear blocks (14, 16) define a fluid flow path 32 (FIG. 3) within the housing. In this exemplary embodiment, the housing 12 includes an inlet spigot 34 and an outlet spigot 36, and the fluid flow path 32 provides fluid communication between the inlet spigot and the outlet spigot. The inlet is coupled to receive fluid from the fluid flow system (not shown), and the outlet delivers the fluid back to the fluid flow system. Both the inlet spigot 34 and the outlet spigot 36 are disposed on the bottom side of the housing The direct flow regulator 18 is in fluid communication with the inlet spigot 34 and is configured to regulate the flow within the housing within prescribed parameters to enable accurate measurements. In the exemplary embodiment, the direct flow regulator is disposed into a cavity 38 machined into the front block 14 of the housing 12. The cavity is generally cylindrical and has an overall depth of about 1.3 inches and an overall diameter of 2.6 inches.

In the exemplary embodiment, the direct flow regulator 18 includes a body 40 of clear polycarbonate material and a filter 42 disposed across the cavity 38. A membrane 44 is placed behind the filter 42 and includes an aperture 46 that allows fluid to flow past the filter 42 and membrane 44 into a center channel of the body. Springs (not shown) behind the membrane 44 control the flow of fluid through the center channel by forcing the membrane forward, thus allowing fluid to enter the center channel when the pressure on the anterior of the direct flow regulator is below a prescribed level. When the pressure on the anterior of the direct flow regulator increases the membrane 44 forced against the center channel closing the gap and inhibiting the flow of fluid through it. Other embodiments of the direct flow regulator may also be used, such as those commonly implemented and understood by those of ordinary skill in the art.

Figure 4:
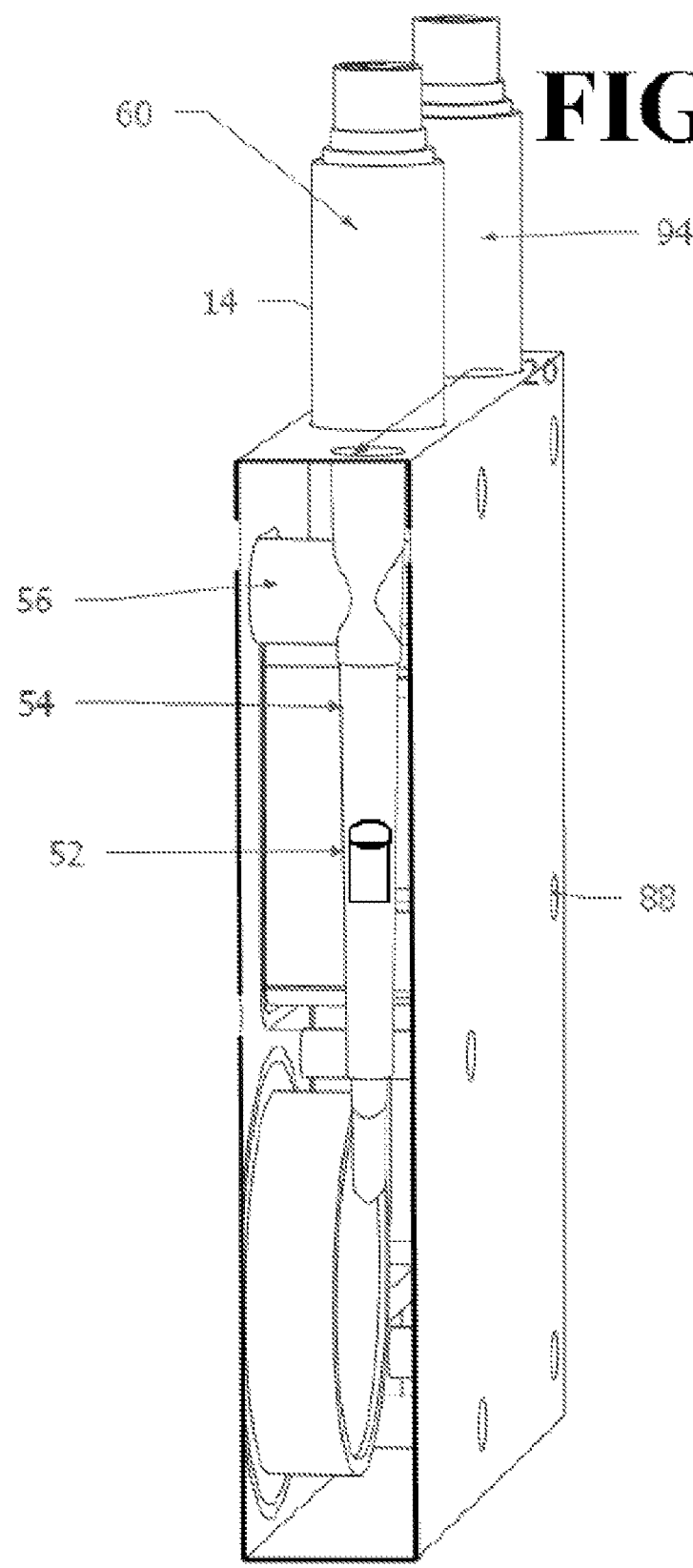
FIG. 4 is a cross sectional view of the front block of the flow cell assembly of FIG. 1

With reference to FIGS. 1 and 4, the variable flow meter 20 is disposed between the flow regulator 18 and the first measuring chamber 22. The flow meter includes a float 52 disposed in a channel 54. In the exemplary embodiment, the channel has a varying diameter; however, it may be of any configuration used to measure the flow of the fluid in the housing 12. The outlet from the flow regulator is offset, so it tends to induce a fluid swirl and consequently a spinning of the float 52 in the flow meter. The outflow of the variable flow meter 20 enters a first connection channel 56 that connects the flow meter to the bottom of the first measuring chamber 22.

In the exemplary embodiment, the fluid flow path 32 includes two measuring chambers, i.e., the first measuring chamber 22 and a second measuring chamber 58. In other embodiment, one or more measuring chamber can be used. The measuring chambers can include a similar configuration having an inlet aperture at a bottom of the measuring chamber and a spaced-apart gravity overflow.

The first measuring chamber 22 is configured to receive a sensor 60 in a vertical orientation. A sensor opening 62 is defined by the housing 12 and is aligned with the measuring chamber to enable the fluid sensor to extend through the sensor opening into the measuring chamber. More particularly, the sensor opening 62 and the measuring chamber 22 are configured such that the sensing end 30 of the fluid sensor 60 is positioned in alignment with the inlet aperture 26 thereby causing the fluid flow exiting the inlet aperture to be directed towards the sensing end. The inlet aperture 26 is disposed at a bottom of the measuring chamber.

In the exemplary embodiment, the fluid sensor 60 has a generally cylindrical configuration with the sensing end 30 disposed at a distal end of the sensor. The sensor opening 62 in the measuring chamber 22 are configured to securely receive the fluid sensor, in a generally vertical orientation. Thus, the gravity overflow 28 of the measuring chamber 22 is positioned proximate to intermediate region of the fluid sensor. In this manner, the sensing end can remain continually exposed to fluid.

The gravity overflow 28 is located at the upper end of the measuring chamber 22. The gravity overflow is connected to the second connection channel 64, which runs between the first measuring chamber 22 and the second measuring chamber 58.

The housing 12 further includes a sample spigot 66 for retrieving samples of the fluid to aid in sensor calibration. In the exemplary embodiment, the sample spigot is coupled to the base of the housing and is in fluid communication with the second connection channel 64.

The second measuring chamber 58 is down flow from the first measuring chamber 22. The second measuring chamber configured to receive a second fluid sensor 94 such that a sensing end 96 of the second fluid sensor is disposed proximate to an inlet aperture of the second measuring chamber, the second measuring chamber having a gravity overflow spaced apart from the inlet aperture.

The second connection channel 64 terminates at the inlet aperture 68 of the second measuring chamber 58. The second measuring chamber is very similar to the first measuring chamber 22. Again, a sensor opening 70 at the top of the second measuring chamber allows for a vertically placed sensor 94, e.g., pH or chlorine. A gravity overflow 72 is positioned proximate to intermediate region of the fluid sensor. In this manner, the sensing end can remain continually exposed to fluid.

The housing 12 defines a ventilation aperture 76 for maintaining ambient air pressure within the fluid flow path 32. The third connection channel 74 runs from the second gravity overflow area 72 to the outlet spigot 36. The ventilation aperture is connected the third connection channel. The ventilation aperture is disposed on an upper end of the housing between the first sensor opening 62 and the second sensor opening 70.

With reference again to FIG. 2, the housing 12 includes mounting brackets 100 dispose on the rear surface of the rear block. The mounting brackets enable the assembly 10 to be mounted in a convenient location for operators of the system.

The mating sides of the front and the rear blocks 14, 16 define a channel 80 for receiving a sealant 82 to provide a fluid-tight disposed seal about the fluid flow path 32. More particularly, the channel runs along the contours and edges of the direct flow regulator 18, the first measuring chamber 22, the first gravity overflow 28, the second measuring chamber 58, and the second gravity overflow 72.

Referring now to FIG. 2, the front block 14 defines a plurality of apertures 86, and the rear block 16 defines a plurality of apertures 88 aligned with the plurality of apertures 86 of the front block. The assembly further includes securing devices 90 that extend though the apertures to secure the blocks together.

Figure 5:
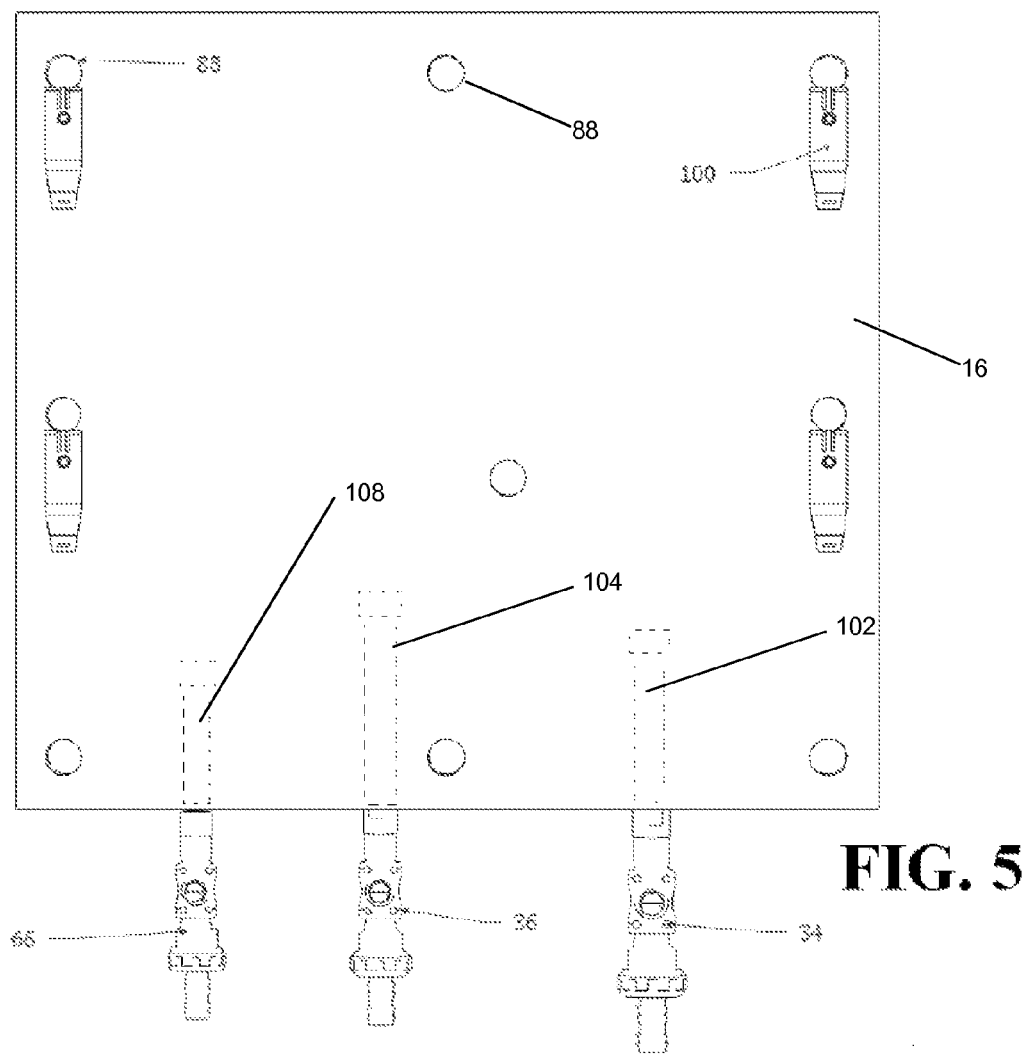
FIG. 5 is an elevational view of the rear block of the flow cell assembly of FIG. 1.

Referring now to FIG. 5, the rear block 16 defines internal channels (102, 104, 108) that enable flow between the spigots (36, 36, 66) and the fluid flow path 32. In the exemplary embodiment, the channels are drilled out through the bottom end and the mating side of the rear block. The internal channel 102 couples the inlet spigot 36 to the flow regulator 18. The internal channel 104 couples the outlet spigot 36 and the third connection channel 74. The internal channel 108 couples the sample spigot 66 and the second connection channel 64.

In the exemplary embodiment, the front block 14 of the housing is 7.5 inches wide, 7 inches tall and 1.5 inches thick. The rear block 16 of the housing is 7.5 inches wide, 7 inches tall and 1 inch thick. In addition, the fluid flow path is machined in place, by removing material from of the front block, to define the flow path. Other embodiments may provide various dimensions.

It should be appreciated from the foregoing that the present invention provides a flow cell assembly for fluid sensors. The assembly includes a housing configured to couple to an external source of fluid for measurement. The assembly further includes a flow regulator and a flow meter disposed within the housing to facilitate controlled fluid. The housing defines one or more measuring chambers each configured to receive a fluid sensor. Each measuring chamber includes an inlet aperture and a gravity overflow spaced apart from the inlet aperture. Each measuring chamber is configured to receive a fluid sensor such that a sensing end of the fluid sensor is disposed proximate to an inlet aperture of the measuring chamber, thereby ensuring controlled fluid pressure proximate to the sensing end.

Although the invention has been disclosed in detail with reference only to the exemplary embodiments, those skilled in the art will appreciate that various other embodiments can be provided without departing from the scope of the invention. Accordingly, the invention is defined only by the claims set forth below.

What is claimed is:

1. A flow cell assembly, comprising:
a housing having a housing inlet configured to couple to an external source of fluid for measurement, the housing defining a measuring chamber having an inlet aperture and a gravity overflow spaced apart from the inlet aperture, the measuring chamber configured to receive a fluid sensor such that a sensing end of the fluid sensor is disposed proximate to an inlet aperture of the measuring chamber;

a flow regulator disposed within the housing in fluid communication with the housing inlet, the flow regulator configured to regulate the flow of fluid received through the housing inlet, the flow regulator having a regulator outlet; and a variable area flow meter disposed within the housing in fluid communication with the regulator outlet, the flow meter configured to provide a visual reference of fluid flow.

2. A flow cell assembly as defined in claim 1, wherein an upper end of the housing defines a sensor opening aligned with the measuring chamber to enable the fluid sensor to extend through the sensor opening into the measuring chamber such that the sensing end of the fluid sensor is positioned in alignment with the inlet aperture thereby causing the fluid flow exiting the inlet aperture to be directed towards the sensing end.

3. A flow cell assembly as defined in claim 2, wherein the sensor opening and the measuring chamber are configured to receive a fluid sensor having a generally cylindrical configuration and having the sensing end disposed at a distal end of the sensor.

4. A flow cell assembly as defined in claim 2, wherein the inlet aperture is disposed at a bottom of the measuring chamber.

5. A flow cell assembly as defined in claim 1, wherein the housing defines a second measuring chamber down flow from the first measuring chamber, the second measuring chamber configured to receive a second fluid sensor such that a sensing end of the second fluid sensor is disposed proximate to an inlet aperture of the second measuring chamber, the second measuring chamber having a gravity overflow spaced apart from the inlet aperture.

6. A flow cell assembly as defined in claim 5, wherein an upper end of the housing defines a sensor opening aligned with the second measuring chamber to enable the second fluid sensor to extend through the sensor opening into the second measuring chamber such that the sensing end of the second fluid sensor is positioned in alignment with the inlet aperture of the second measurement chamber thereby causing the fluid flow exiting the inlet aperture to be directed towards the sensing end of the second fluid sensor, the second fluid sensor is a generally cylindrical.

7. A flow cell assembly, comprising:
a housing having a housing inlet configured to couple to an external source of fluid for measurement and having a housing outlet, the housing including
a front block having a front side and a mating side on an opposing side of the front block relative to the front side,
a rear block having a rear side and a mating side on an opposing side of the rear block relative to the rear side, the front block and the rear block sandwiched together such that the mating sides of the front and the rear blocks are facing each other, and
the mating sides of the front and the rear blocks defining a fluid flow path within the housing, the fluid flow path including a measuring chamber having an inlet aperture and a gravity overflow spaced apart from the inlet aperture, the measuring chamber configured to receive a fluid sensor such that a sensing end of the fluid sensor is disposed proximate to an inlet aperture of the measuring chamber;
a flow regulator disposed within the housing, along the fluid flow path prior to the measuring chamber, in fluid communication with the housing inlet, the flow regulator configured to regulate the flow of fluid received through the housing inlet, the flow regulator having a regulator outlet; and a variable area flow meter disposed within the housing, along the fluid flow path, in fluid communication with the regulator outlet, the flow meter configured to provide a visual reference of fluid flow.

8. A flow cell assembly as defined in claim 7, wherein the fluid flow path provides fluid communication between the housing inlet and the housing outlet.

9. A flow cell assembly as defined in claim 7, wherein the mating sides of the front and the rear blocks define a channel for receiving a sealant to provide a fluid-tight disposed seal about the fluid flow path.

10. A flow cell assembly as defined in claim 7, further comprising a spigot in fluid communication with the fluid flow path for dispensing a fluid sample.

11. A flow cell assembly as defined in claim 7, wherein the variable area flow meter is disposed between the flow regulator and the measuring chamber along the fluid flow path.

12. A flow cell assembly, comprising:
a housing having a housing inlet configured to couple to an external source of fluid for measurement and a housing outlet, the housing including
a front block having a front side and a mating side on an opposing side of the front block relative to the front side,
a rear block having a rear side and a mating side on an opposing side of the rear block relative to the rear side, the front block and the rear block sandwiched together such that the mating sides of the front and the rear blocks are facing each other,
the mating sides of the front and the rear blocks defining a fluid flow path within the housing, including a plurality of measuring chambers sequentially disposed along the fluid flow path, each measuring chamber having an inlet aperture and a gravity overflow spaced apart from the inlet aperture, each measuring chamber configured to receive a fluid sensor such that a sensing end of the fluid sensor is disposed proximate to an inlet aperture of the measuring chamber;
a flow regulator disposed within the housing, along the fluid flow path, in fluid communication with the housing inlet, the flow regulator configured to regulate the flow of fluid received through the housing inlet, the flow regulator having a regulator outlet; and
a variable area flow meter disposed within the housing, along the fluid flow path, in fluid communication with the regulator outlet, the flow meter configured to provide a visual reference of fluid flow.

13. A flow cell assembly as defined in claim 12, wherein the fluid flow path provides fluid communication between the housing inlet and the housing outlet.

14. A flow cell assembly as defined in claim 13, wherein the variable area flow meter is disposed between the flow regulator and the first measuring chamber of the plurality of measuring chambers along the fluid flow path.

15. A flow cell assembly as defined in claim 13, a spigot in fluid communication with the fluid flow path for dispensing a fluid sample.

16. A flow cell assembly as defined in claim 12, wherein an upper end of the housing defines a plurality of sensor openings, each sensor opening aligned with a corresponding measuring chamber to enable the respective fluid sensor to extend through the sensor opening into the measuring chamber such that the sensing end of the fluid sensor is positioned in alignment with the inlet aperture thereby causing the fluid flow exiting the inlet aperture to be directed towards the sensing end.

17. A flow cell assembly as defined in claim 16, wherein each sensor opening and the corresponding measuring chamber are configured to receive a fluid sensor having a generally cylindrical configuration and having the sensing end disposed at a distal end of the sensor, each inlet aperture being disposed at a bottom of the corresponding measuring chamber.

18. A flow cell assembly as defined in claim 16, wherein the mating sides of the front and the rear blocks define a channel for receiving a sealant to provide a fluid-tight disposed seal about the fluid flow path.

19. A flow cell assembly as defined in claim 12, wherein the front block defines a plurality of apertures, and the rear block defines a plurality of apertures aligned with the plurality of apertures of the front block, to enable securing devices to extend there-though.

20. A flow cell assembly as defined in claim 12, wherein the housing defines a ventilation aperture along an upper end to maintain ambient air pressure in the housing.

21. A flow cell assembly as defined in claim 1, wherein the variable area flow meter includes a float disposed in a channel of the flow meter.

22. A flow cell assembly as defined in claim 1, wherein the flow regulator is positioned along the fluid flow path prior to the measuring chamber.

23. A flow cell assembly as defined in claim 22, wherein the variable area flow meter is along the fluid flow path between the flow regulator and the measuring chamber.

* * * * *